Figure 1:
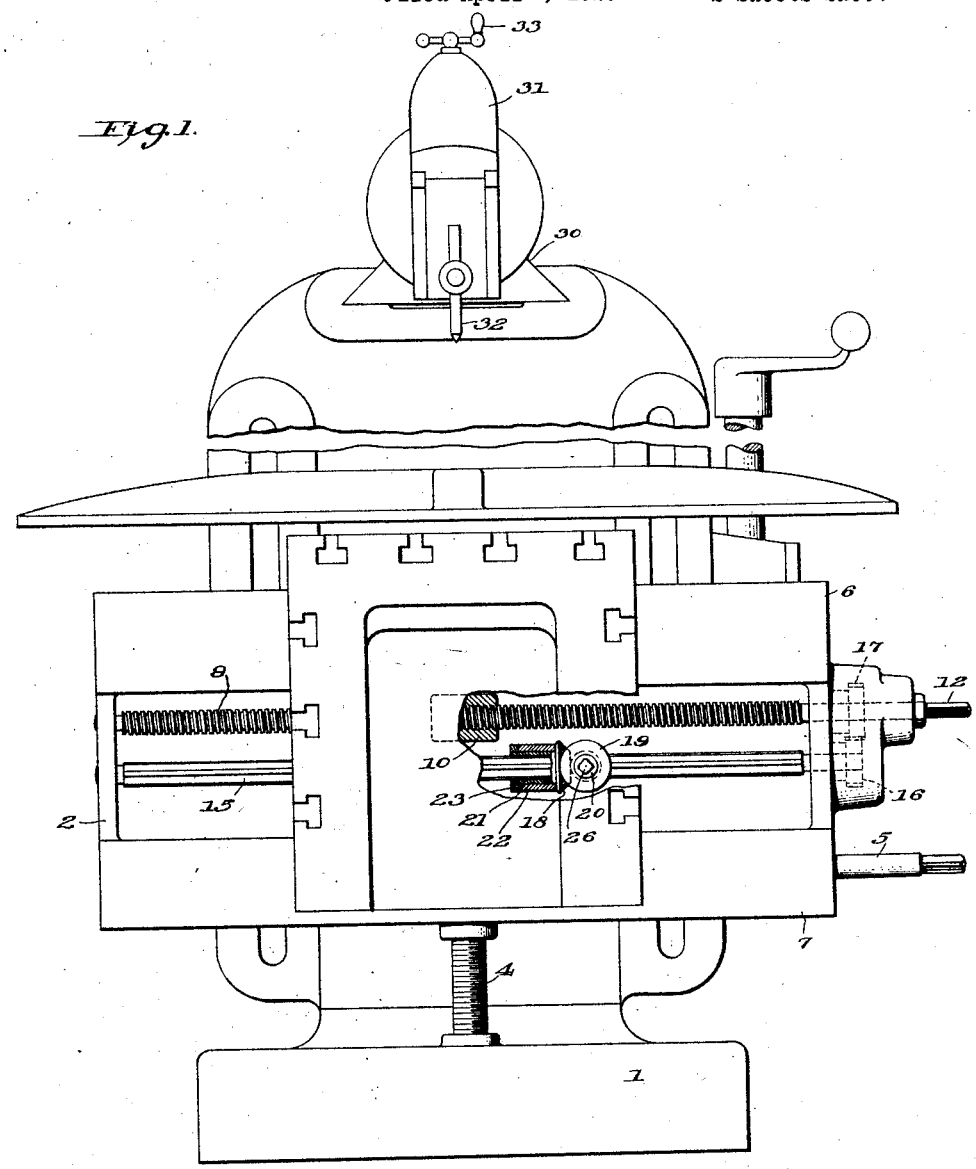

Nov. 6, 1928. 1,690,583
H. W. JACOBSON
FEED CONTROL FOR SHAPING MACHINE WORKTABLES
Filed April 2, 1925 2 Sheets-Sheet 1

Inventor
Hugo W. Jacobson
By Attorney
Albert F. Nathan

Nov. 6, 1928.

H. W. JACOBSON 1,690,583

FEED CONTROL FOR SHAPING MACHINE WORKTABLES

Filed April 2, 1925  2 Sheets-Sheet 2

Inventor
Hugo W. Jacobson
By Attorney
Albert F. Nathan

Patented Nov. 6, 1928.

1,690,583

UNITED STATES PATENT OFFICE.

HUGO W. JACOBSON, OF ARLINGTON, NEW JERSEY, ASSIGNOR TO GOULD & EBERHARDT, OF NEWARK, NEW JERSEY, A CORPORATION OF NEW JERSEY.

FEED CONTROL FOR SHAPING-MACHINE WORKTABLES.

Application filed April 2, 1925. Serial No. 20,127.

My invention is concerned with feeding mechanism for a shaping machine and is particularly concerned with feeding mechanism which may be controlled from the table of the shaping machine.

In shaping machines of modern construction a ram which is mounted on top of the machine frame, is reciprocated through various lengths of strokes according to the work being operated on. The ram carries a tool head which may be operated to move the tool towards or away from the work being operated on. A work carrying table, which is located below the tool head, is slidably mounted on a cross head secured to the main frame of the machine. A screw shaft, which is rotatably mounted on the cross head, is connected with a stationery nut on the table for effecting movement of the table along the head. A machine, as above described, is often called upon to shape a piece of work to a form which will require feeding movements by the tool at the same time that the feeding movements of the table are being effected. If the tool is forming a horizontal surface on the work it is apparent that only feeding movements by the work carrying table need be effected by the machine. However, if the surface cut by the tool on the work varies from a horizontal plane, it is apparent vertical feeding movements must also be effected by the tool head.

In many shaping machines heretofore constructed, the manual feeding of the work table has been accomplished solely by a hand lever fitted to the end of the screw shaft. The hand wheel or lever which is located on the ram for feeding the tool, is positioned some distance from the hand lever for operating the table feed screw, and, accordingly renders it difficult for the operator located at the side of the table to control both feeding movements simultaneously. If the left hand of the operator is used to operate the tool feed it is apparent the left arm obscures the operator's vision of the work. Moreover it is very inconvenient for the operator to control the tool feed by means of his right hand and operate the table feed by means of his left-hand.

In a feeding mechanism constructed in accordance with my invention, an operating rod projects from the table at the end of the shaper for controlling the feeding movement of the table. A control handle mounted on such operating shaft can be easily operated by the left hand of the operator without in any way interfering with his vision of the work. In my preferred construction the operating shaft on the table carries a bevelled gear wheel which meshes with a bevelled gear wheel splined to a shaft mounted on the cross head parallel to the table feed screw. The two shafts on the cross head are connected together by gearing so as to rotate together. Thus, it is apparent rotation of the operating shaft on the table rotates the feed screw shaft to effect feeding movement of the table.

It has been proposed heretofore to control the feed nut on the table by means of an operating shaft on the table. In such mechanism the feed nut is rotated and the screw shaft on the rail is held stationary when it is desired to operate the table feed by mechanism mounted on the table. If the table is fed by rotating the screw shaft on the cross head it is necessary to have the feed nut on the table locked against rotation. The locking and unlocking of the feed nut on the table and the screw shaft on the cross head is an added operation for the machine operator to perform. In the feed mechanism constructed in accordance with my invention the screw shaft and the feed nut maintain the same relationship to each other at all times.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which;—

Figure 2:
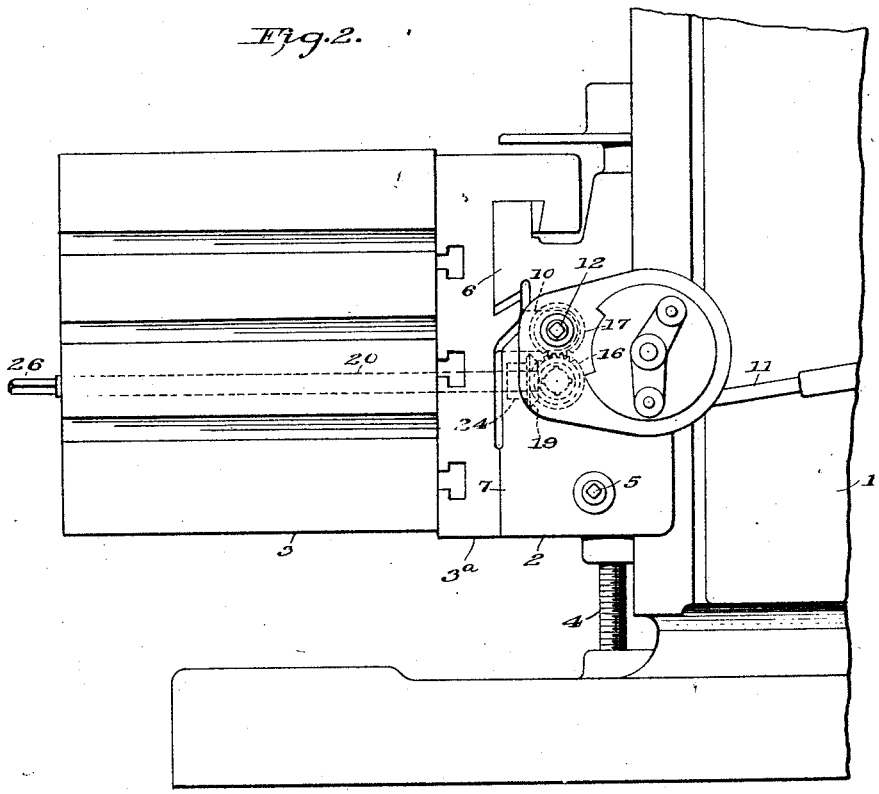
Figure 3:
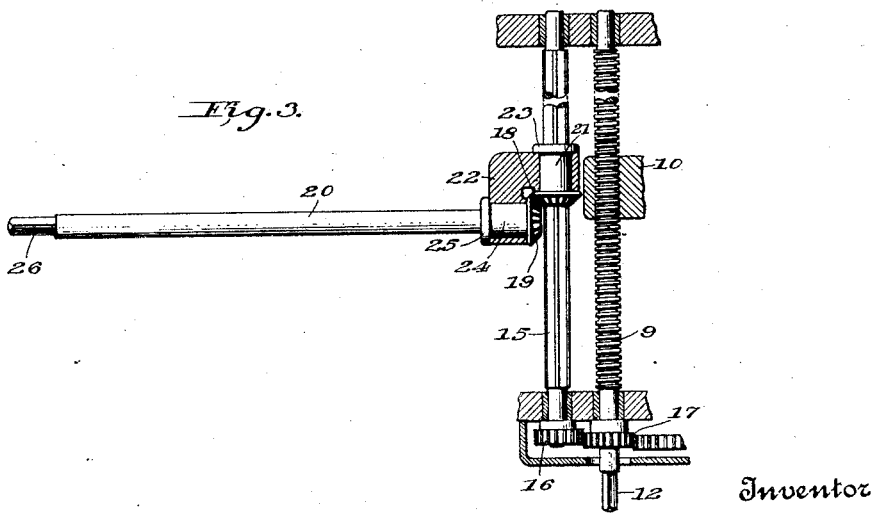

Figure 1 is an end elevational view of a shaping machine constructed in accordance with my invention. Fig. 2 is a partial front elevational view of the shaping machine shown in Fig. 1. Fig. 3 is a sectional view illustrating the shafts for controlling the table feeding movement.

Referring to the drawings, a shaping machine is illustrated comprising a main frame 1 on which is mounted a cross head 2 and a work carrying table 3 having a saddle 3ª secured to the cross head. The cross head 2 is secured to the main frame 1 in any conventional manner and is vertically moved on the main frame by means of a screw shaft 4. A shaft 5 is provided for operating a nut (not shown) to effect movement of the head 2 along the screw shaft 4. A ram 30 is mounted on the top of the frame 1 and carries a tool head 31. The tool head 31 carries a cutting tool 32 and is moved towards and away from the work by means of a screw under the control of a hand lever 33. Inasmuch as my invention is not particularly concerned with the mechanism for raising and lowering the cross head a description thereof is deemed unnecessary. Moreover, it has been considered unnecessary to completely illustrate and describe the ram, which carries the cutting tool, and the mechanism for reciprocating the ram.

The saddle on the work carrying table 3 is mounted on and slidable along the cross head 2. The cross head 2 is provided with two cross arms 6 and 7 which support and also guide the work carrying table 3. The movement of the work carrying table 3 along the cross head is effected by means of a screw shaft 9 which is rotatably mounted in the head. The screw shaft 9 is fitted to a stationary nut 10 which forms a part of or is secured to the work table. Inasmuch as the nut 10 is held stationary on the work table it is apparent rotation of the screw shaft 9 serves to effect translatory movement of the work table. The screw shaft 9 may be automatically operated by means of a connecting rod 11 in a conventional manner or may be manually operated by means of a crank lever (not shown) which is fitted to the squared end 12 shown in the drawings. The automatic operation of the screw shaft 9 forms no feature of my invention and it is accordingly deemed unnecessary to describe the automatic operation of the screw shaft. Such automatic mechanisms are old and well-known in the art.

A transverse shaft 15 is mounted on the cross head 2 parallel to the screw shaft 9. Such transverse shaft 15 is connected to the screw shaft 9 by means of gear wheels 16 and 17, the gear wheel 16 being fixedly mounted on the shaft 15 and the gear wheel 17 being fixedly mounted on the screw shaft 9. Thus, it is apparent rotation of the shaft 15 compels rotation of the screw shaft 9 and accordingly feeding movement by the work carrying table. The transverse shaft 15 carries a bevelled gear wheel 18 which meshes with a bevelled gear wheel 19 on an operating shaft 20. The operating shaft 20 and the bevelled gear wheels 18 and 19 are mounted on the work carrying table 3 and serve to control the manual feeding movement of the table in a manner to be hereinafter more fully described. The bevelled gear wheel 18 is provided with a disk portion having the bevel teeth formed thereon and a hub portion 21 which extends through a bracket 22 on the table as best shown in Fig. 3 of the drawings. A collar member 23, which encircles the transverse shaft 15, is secured to the hub member 21. The bevelled gear wheel 18 is splined to the transverse shaft 15 and is compelled to follow the movements of the table by reason of collar member 23 and the disk portion having the gear teeth formed thereon being located on opposite sides of the bracket 22. The bevelled gear wheel 19 is provided with a hub portion 24 which extends through the bracket 22 as shown in Fig. 3 of the drawings. A collar member 25 which encircles the operating shaft 20 is secured to the end of the hub portion 24 in any suitable manner to prevent axial movement of the bevel gear wheel in the bracket 22.

In the mechanism above described it is apparent the squared end 26 of the operating shaft 20 may be operated by a hand crank (not shown) for controlling the feeding movements of the work table 3. The operating shaft 20 rotates the transverse splined shaft 15 by means of the gear wheels 18 and 19. The splined shaft 15 by means of the gear wheel 16 and 17 compels rotation of the screw shaft 9. Accordingly, the screw shaft 9 may not only be operated by a hand crank on its own squared end 12 but also may be operated by a hand crank on the squared end 26 of the operating shaft 20. In the above construction it will be noted that it is unnecessary to in any way change the relationship of the nut 10 to the screw shaft 9 when the feeding movements of the table are controlled by the operating shaft 20. Moreover, it is unnecessary to disconnect the shaft 20 or the splined shaft 15 from the screw shaft 9 when the screw shaft 9 is operated manually by the squared end 12 or is operated automatically by means of the lever 11.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention, and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A shaping machine combining a frame; a reciprocating ram; a normally stationary cross head secured to the frame beneath the ram; a work table movable horizontally on said cross head; a feed screw rotatably but non-translatably journaled in said cross head, said screw being provided at one end with means for effecting manual rotation thereof; a non-rotatable nut carried by said work-table and having a threaded connection with said screw; a single purpose shaft rotatably and non-translatably journaled in said cross head parallel with said screw; a spur gear connection between said shaft and said screw; a pair of mating bevel gears carried by said work-table, one of said gears having a spline connection with said single purpose shaft; an operating shaft rotatably journaled in said table transverse to said single purpose shaft and connected to the other of said bevel gears; and manual means for rotating said operating shaft from the front end of said work-table.

2. A shaping machine combining a frame; a reciprocating ram; a vertically adjustable tool carried at the front end of said ram; a cross head fixed to said frame beneath said ram; a work-table translatably mounted on said cross head; a feed screw rotatably and non-translatably journaled in said cross head; a non-rotatable nut carried by said work-table and having a threaded connection with said feed screw; power means connected with said feed screw to rotate the latter thereby to effect power translation of said work-table; manually actuated means engaging one end of said feed screw to effect rotation thereof; and auxiliary single purpose means carried by said work-table below said tool and operable from the front end of the work-table and permanently connected with said feed screw to rotate the latter to effect translation of said work-table.

3. A shaping machine combining a frame; a cross head fixed thereto; a work-table translatably mounted on said cross head; a feed screw rotatably but non-translatably journaled in said cross head; a nut non-rotatably carried by said work-table and having a threaded connection with said feed screw; manual means for rotating said feed screw to effect translation of said work-table; and auxiliary manually actuable means including a manually rotatable shaft carried by said work-table and permanently and positively connected with said feed screw for rotating the latter to effect translation of said work-table, said auxiliary means also including a second shaft journaled in said cross head; a positive drive between the last named shaft and the feed screw; and a spline connection between the manually rotatable shaft and the second shaft.

In witness whereof, I have hereunto subscribed my name.

HUGO W. JACOBSON.